(12) United States Patent
Dehne et al.

(10) Patent No.: US 7,178,660 B2
(45) Date of Patent: Feb. 20, 2007

(54) WORKPIECE TRANSPORT SYSTEM WITH INDEPENDENTLY DRIVEN PLATFORMS

(75) Inventors: Noel F. Dehne, Novi, MI (US); Gerald E. Chilson, Alanson, MI (US); Earl A. Raynal, Jr., Petoskey, MI (US); James J. Bedells, Northville, MI (US); Lewis R. Poole, Boyne City, MI (US); Timothy R. Crumbaugh, Boyne City, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 374 days.

(21) Appl. No.: 10/611,611

(22) Filed: Jul. 1, 2003

(65) Prior Publication Data

US 2004/0054435 A1 Mar. 18, 2004

Related U.S. Application Data

(60) Provisional application No. 60/393,564, filed on Jul. 2, 2002.

(51) Int. Cl.
*B61B 13/00* (2006.01)

(52) U.S. Cl. .................. 198/463.1; 104/287; 104/288; 213/76; 180/14.1; 29/791

(58) Field of Classification Search ............. 198/463.1; 104/287, 288; 213/76; 180/14.1; 29/791, 29/799

See application file for complete search history.

(56) References Cited

U.S. PATENT DOCUMENTS

| | | | |
|---|---|---|---|
| 363,783 A | 5/1887 | Warren | |
| 2,634,851 A | 4/1953 | Steinhoff | |
| 2,816,643 A | 12/1957 | Klamp | |
| 2,844,241 A | 7/1958 | King | |
| 2,883,942 A | 4/1959 | Johnson | |
| 3,134,489 A | 5/1964 | Gillham | |
| 3,338,429 A | 8/1967 | Zetzsche | |
| 3,415,200 A | 12/1968 | Bishop et al. | |
| 3,511,187 A | 5/1970 | Hanna | |
| 3,518,946 A | 7/1970 | Kavieff | |
| 3,581,670 A | 6/1971 | Larivee | |
| 3,707,923 A | 1/1973 | Woodling | |
| 3,810,428 A | 5/1974 | Klamp | |
| 3,948,186 A | 4/1976 | McCaul | |
| 4,144,818 A | 3/1979 | Fletcher | |
| 4,284,188 A | 8/1981 | Gram | |
| 4,438,701 A | 3/1984 | Murai et al. | |
| 4,440,090 A | 4/1984 | Murai et al. | |
| 4,548,135 A | 10/1985 | Kupczyk | |
| 4,564,100 A | 1/1986 | Moon | |
| 4,616,570 A | 10/1986 | Dehne | |
| 4,645,885 A | 2/1987 | Blesinger | |
| 4,646,650 A | 3/1987 | Kondo et al. | |

(Continued)

*Primary Examiner*—Gene O. Crawford
*Assistant Examiner*—Mark A. Deuble
(74) *Attorney, Agent, or Firm*—Dickinson Wright PLLC

(57) ABSTRACT

A manufacturing operation having a first production area, a second production area, and a plurality of platforms each having independently controllable drive assemblies for moving the platforms through the production and delivery areas. Adjacent platforms are spaced from one another a first distance in the delivery areas and a second distance in the production areas, wherein the first distance is greater than the second distance and, preferably, where the second distance creates a "zero" gap between adjacent platform decks.

16 Claims, 5 Drawing Sheets

U.S. PATENT DOCUMENTS

| | | |
|---|---|---|
| 4,646,915 A | 3/1987 | Ohtaki et al. |
| 4,669,388 A | 6/1987 | Dehne et al. |
| 4,745,865 A | 5/1988 | Dehne |
| 4,771,697 A | 9/1988 | Dehne |
| 4,811,685 A | 3/1989 | Murai |
| 4,924,777 A | 5/1990 | Linton et al. |
| 4,944,229 A | 7/1990 | Arakawa et al. |
| 4,947,978 A | 8/1990 | Rhodes |
| 5,012,917 A | 5/1991 | Gilbert et al. |
| 5,013,203 A | 5/1991 | Wakabayashi |
| 5,195,630 A | 3/1993 | Donovan et al. |
| 5,253,745 A | 10/1993 | van den Bergh et al. |
| 5,318,167 A | 6/1994 | Bronson et al. |
| 5,449,056 A | 9/1995 | Ross |
| 5,503,259 A | 4/1996 | Clopton et al. |
| 5,517,922 A | 5/1996 | Summa et al. |
| 5,547,090 A | 8/1996 | Richter |
| 5,549,050 A | 8/1996 | Rhodes |
| 5,556,466 A | 9/1996 | Martin et al. |
| 5,577,593 A | 11/1996 | Hooper |
| 5,669,309 A | 9/1997 | Carlton et al. |
| 5,706,735 A * | 1/1998 | Lund ...................... 104/88.04 |
| 5,839,567 A | 11/1998 | Kyotani et al. |
| 6,161,483 A | 12/2000 | Lipari et al. |
| 6,182,577 B1 * | 2/2001 | Billings .................... 104/242 |

\* cited by examiner

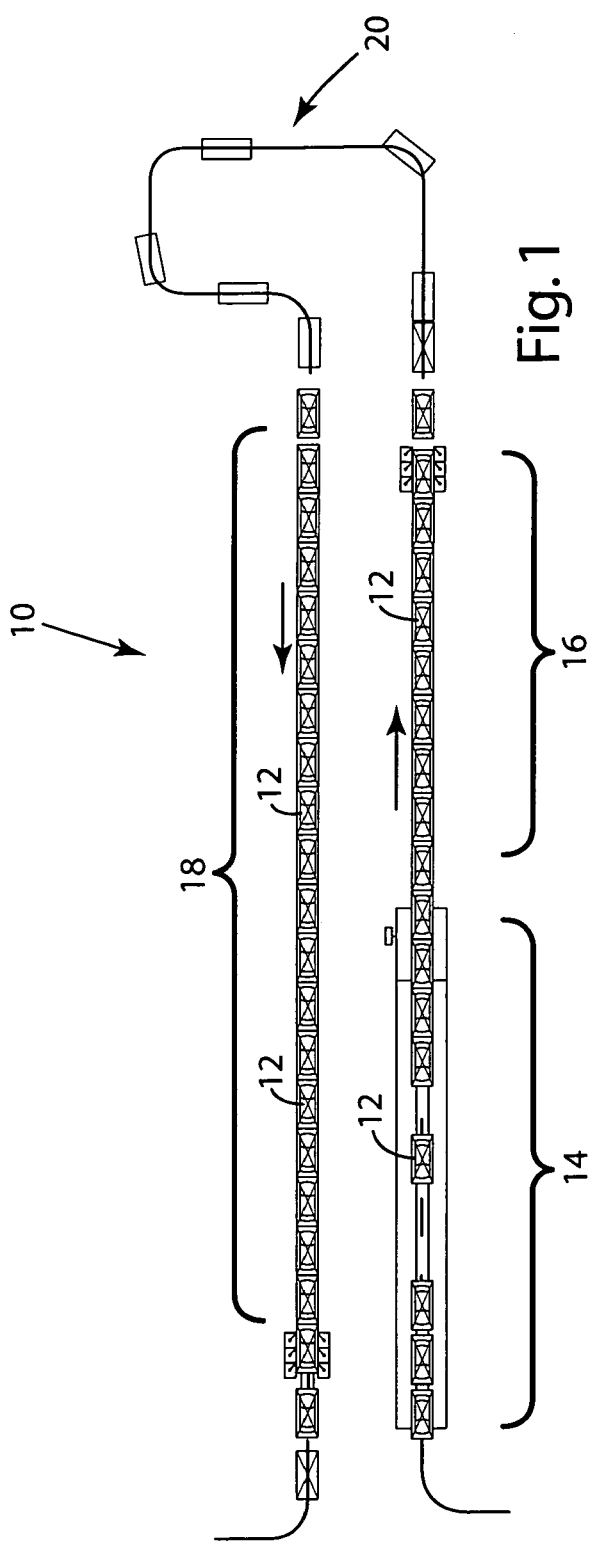
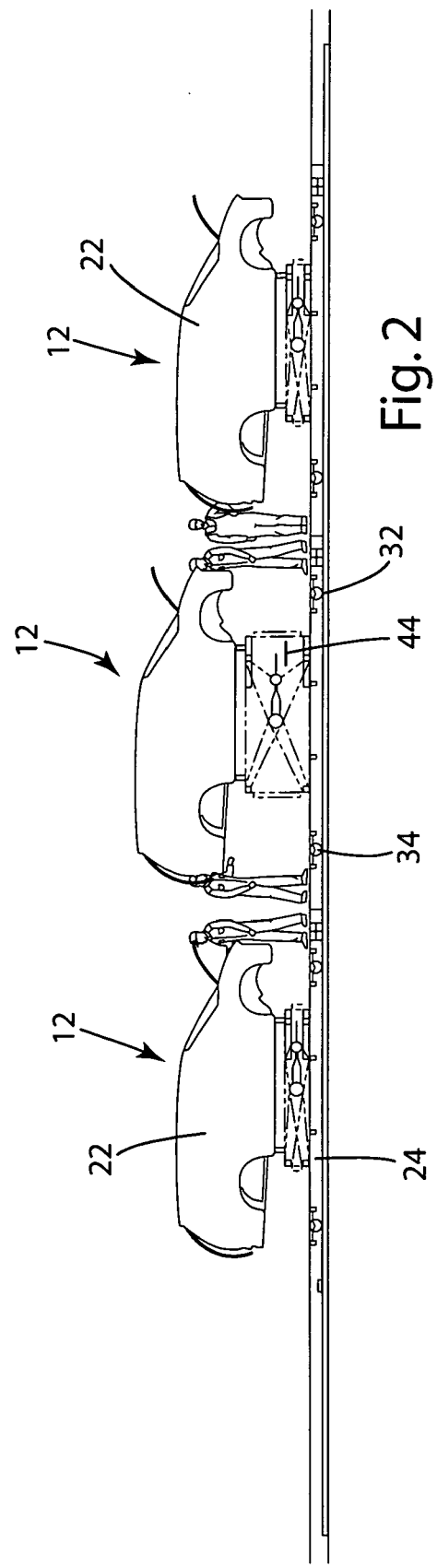

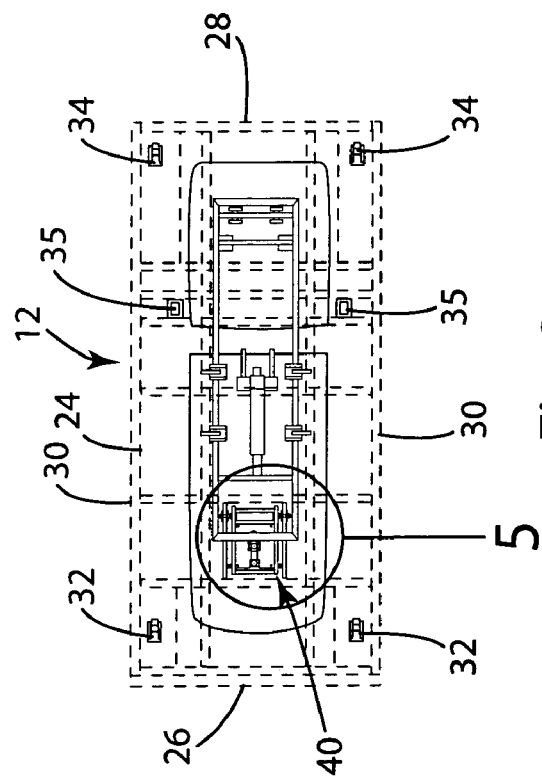
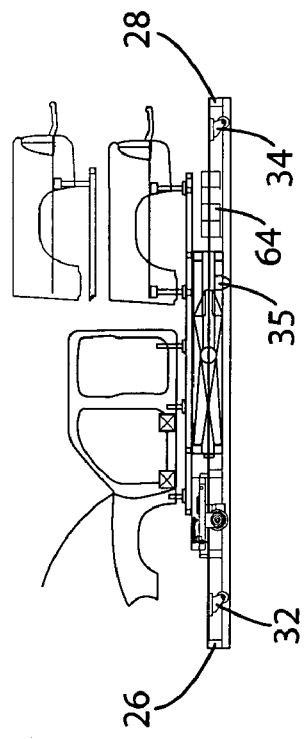
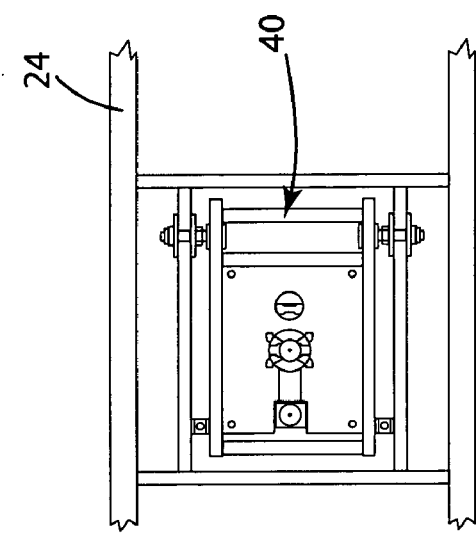
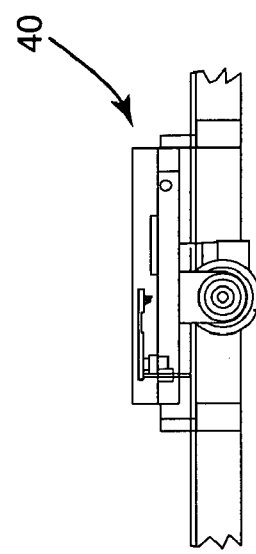

WORKPIECE TRANSPORT SYSTEM WITH INDEPENDENTLY DRIVEN PLATFORMS

CROSS-REFERENCE TO RELATED APPLICATION

This application claims the benefit of U.S. Provisional Application No. 60/393,564, filed Jul. 2, 2002, the entire disclosure of this application being considered part of the disclosure of this application and hereby incorporated by reference.

BACKGROUND OF THE INVENTION

In vehicle assembly and other manufacturing operations, it is often desirable to provide a platform upon which a workpiece is coupled for movement and which permits assembly workers to walk about the platform and perform assembly tasks on the workpiece. One example of such a system is a skillet system, which has recently gained popularity in vehicle general assembly operations. Skillet systems commonly include a plurality of skillets that are conveyed in a train by means of friction drives and powered rollers. In some cases, the platform rides on floor mounted roller conveyor sections and in other cases the platform has wheels which ride on rails. Typical features of conventional skillet systems include a deck of sufficient dimension and structural strength to carry the workpiece and assembly workers and a lifting unit for raising and lowering the workpiece. Adjacent skillets within the train are maintained in abutting relationship commonly through friction drives at the entrance to a production area and retarding drives at the exit.

Despite the increase in popularity of skillet systems, the systems present operational and manufacturing deficiencies that have yet to be addressed in the art. For example, skillet systems commonly require a recessed section or pit in the floor to accommodate the skillet deck, rollers, and drive assemblies. By recessing these components, the support surface of the skillet is at approximately the same elevation as the surrounding floor. Skillet systems are also expensive due to the necessary structural strength of the platform itself as well as the variety of drive and transfer accessories required to transport and properly orient the skillets and workpieces within the manufacturing process. For example, it is commonly desirable to transport skillets through multiple production lines which may require reorientation of the skillet in elevation and/or horizontal alignment. Complex and expensive cross tables, roller tables, elevators, and the like are commonly used in these instances.

SUMMARY OF THE INVENTION

With the above in mind, the need exists for a system having movable platforms that provide skillet functionality at a reduced cost. Other desirable improvements include increased flexibility of operation, and improved overall performance.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 1 is a plan view of a manufacturing operation 10 according to the present invention;

FIG. 2 is a side elevational view of a plurality of platforms within a production area;

FIG. 3 is a top plan view of a representative platform according to the present invention;

FIG. 4 is a side elevational view of the platform illustrated in FIG. 3;

FIG. 5 is an enlarged plan view of the platform drive assembly taken at circle "5" shown in FIG. 3;

FIG. 6 is a side elevational view of the drive assembly shown in FIG. 5;

DETAILED DESCRIPTION OF THE PREFERRED EMBODIMENT

Figure 7:
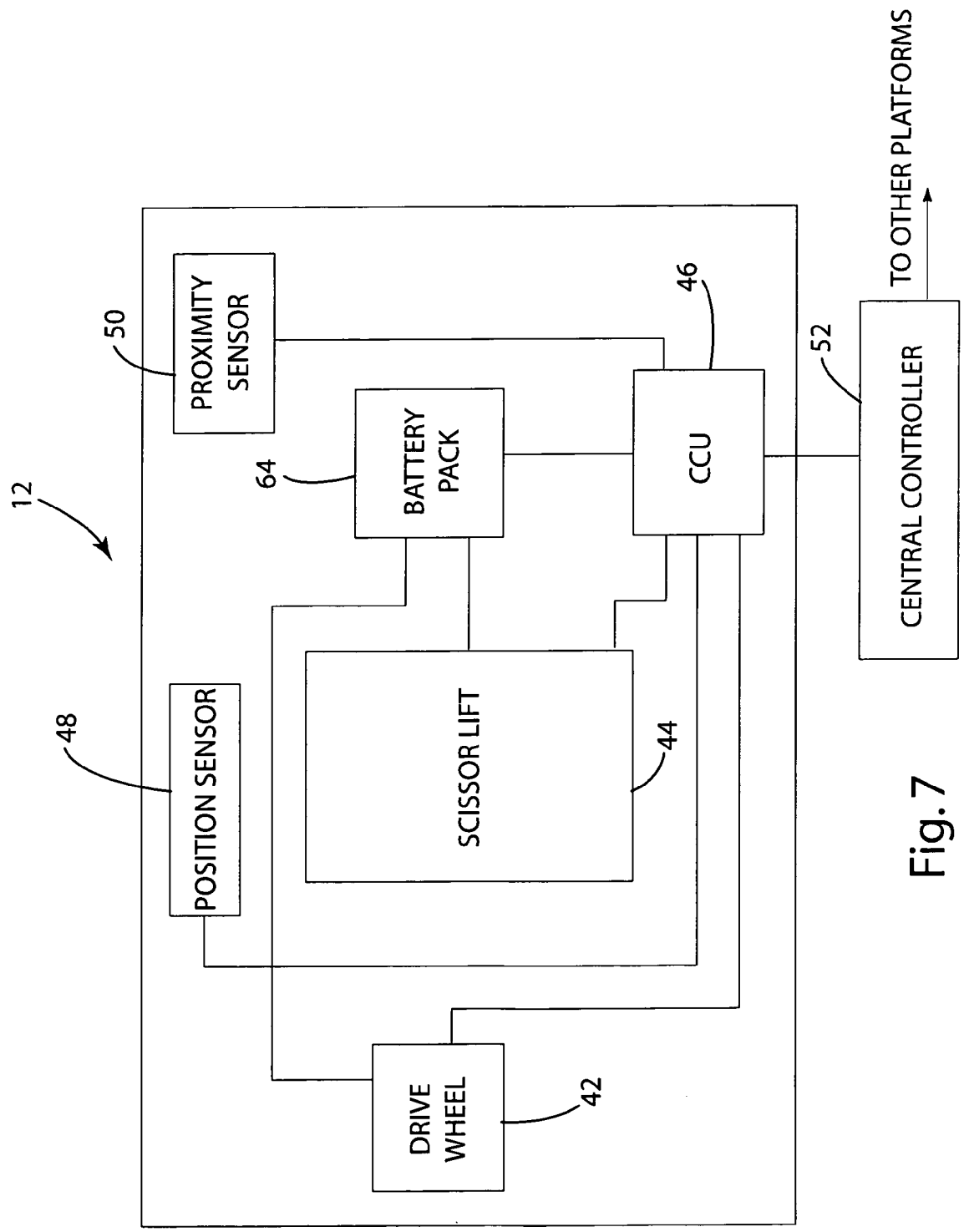
FIG. 7 is a schematic illustration of selected components of the platform.

As is illustrated in the attached drawings, the present invention is directed to a manufacturing operation 10 wherein a plurality of platforms 12 are configured to transport a workpiece throughout the manufacturing operation. While the illustrated drawings show a representative manufacturing operation 10, those skilled in the art will appreciate that the configuration of the operation may vary without departing from the scope of the invention. The illustrated manufacturing operation 10 includes a buffer zone 14, a first production area 16, a second production area 18, and a delivery area 20.

As is more fully explained below, the platform, system, and method of the present invention provides independently drivable platforms that may be guided by a variety of conventional means. The invention provides flexibility in transportation between production areas while providing an effective abutting relationship between adjacent platform decks ("zero" gap) in production areas. The flexibility outside of the production areas allows an aisle for through-traffic, decoupled zones, accumulation buffers, and eliminates transfer mechanisms relative to conventional skillets while increasing ease of reorienting the platforms throughout the manufacturing operation. Thus, outside production areas, the individual platforms can traverse cross aisles or use long spans between assembly lines as well as traverse turn arounds at the end of an assembly line without unduly increasing the overall cost of the system. Further, the independently controlled drive mechanism of each platform facilitates removal of the platforms within production or delivery areas as needed. The drive mechanisms may be operable in forward and reverse directions to further facilitate controlled movement. Notwithstanding these improvements, those skilled in the art will recognize that the platforms may still be transferred through other conventional means, such as elevators, while capitalizing upon virtually any conventional guidance system including both vehicle and central controller based systems, as well as active guidewire, passive guidewire, magnetic tape, optical, laser, inertial, indoor gps, dead reckoning, or mechanical guide rails.

As is illustrated in FIGS. 1–4, each of the platforms 12 preferably have a workpiece 22, such as the illustrated vehicles, coupled to move with the platform through the manufacturing operation. Each platform 12 includes a deck 24 having front and rear ends 26 and 28 and sides 30. Front and rear support wheels 32 and 34, respectively, preferably positioned proximate the four corners of the deck 24, rollingly support the deck during conveyance through the manufacturing operation. The front and rear support wheels 32 and 34 are preferably swivel caster wheels that are pivotable about horizontal and vertical axes. A pair of spring loaded caster wheels 35, preferably pivotable only about their horizontal axes (i.e., non-swiveling casters), are also provided to facilitate controlled steering of the platform. The four corner wheel arrangement described above provides distributed support for the deck thereby decreasing the required structural robustness of the platform relative to existing skillet designs and resulting in weight and cost savings without sacrificing load capacity.

The platform 12 also includes a drive assembly 40 having a steerable drive wheel 42 for propelling the platform. As is shown in FIGS. 5 and 6, the drive assembly 40 is preferably a floating drive permitting vertical displacement of the drive wheel 42 relative to the deck 24 thereby facilitating proper engagement of the drive wheel with the supporting surfaces. While a single steerable drive wheel 42 is illustrated in the drawings, it should be appreciated that dual steerable floating drives may be used. For example, a rear floating drive may be used in place of the spring loaded caster wheels 35 thereby providing a tighter turning radius and better maneuverability. However, it is expected that a single steerable floating drive would be used in most applications so as to minimize the cost of the platform 12. The drive assembly 40 is preferably coupled to a lift device (not shown) that permits manual raising of the assembly so that a drive wheel 42 may be moved out of engagement with the supporting floor thereby permitting manual movement of the platform should the drive assembly fail.

Those skilled in the art will appreciate that various modifications may be made to the above described embodiment of the platform 12. For example, while the anticipated design capacity of the platform is approximately five thousands pounds, the specific structural design of the deck, and other platform components, may be tailored to virtually any particular design loading. For completeness, it is noted that the anticipated dimensions of the deck include a length in the range of fifteen to twenty-five feet, a width between ten and fifteen feet, and a height of approximately eight inches. These dimensions may be modified without departing from the scope of the invention. The deck preferably also includes a raised center section within which the drive assembly 40 is vertically displaceable during the lifting operation described above.

As is illustrated in the drawings, the plan dimensions of the deck 24 relative to the workpiece preferably provides sufficient room for assembly workers to move about the workpiece. The platform may further be provided with a variety of auxiliary components, such as the illustrated scissor lift 44 (FIG. 2) that allows changing of the elevation of the workpiece relative to the deck so as to facilitate the performance of manufacturing operations by the workers.

Each of the platforms 12 also include a cart control unit (CCU) 46 for controlling the operation of the platform such as the movement of the drive wheel 42, actuation of the scissor lift or other auxiliary component 44, and communication with sensor components such as the illustrated position and proximity sensors 48 and 50 (FIG. 7). An optional central controller 52 is also illustrated in FIG. 7. When incorporated into the control system, the central controller can be used for monitoring and/or providing lift height, speed changes, and other parameter data to the plurality of platforms. Guidance of the platforms within and outside the production areas may be achieved through any conventional means such as through use of a guide rail, pin, magnetic tape, buried wire, inertial, dead reckoning, or other known automatic controls. In many of these instances, the CCU 46 may be used to control the guidance and I/O functions. The system also preferably includes an emergency stop, such as a continuous wire disposed within a readable distance of a corresponding sensor on the platform. If the signal in the wire ceases for any reason, the CCU causes the platform to stop its forward movement. The continuous wire may be a buried wire that may also be used for guidance of the platform or may be a separate component provided solely for the stopping function.

The drive assembly 40 of each platform 12 is independently controllable, by the onboard CCU 46 and/or the central controller 52, to permit controlled movement of the platforms relative to one another. In the production areas 16 and 18, the platforms are preferably linked together to form a continuous moving train with "zero" gaps between adjacent decks. For purposes of this application, a "zero" gap means a gap that is sufficiently small to provide a continuous working surface along adjacent decks, with the gap being preferably less than one quarter of an inch and even more preferably less than one-sixteenth inch. While it is generally desirable to minimize the gap between decks, some minimal spacing between adjacent decks does accommodate the inevitable differential movement between adjacent platforms. The "zero" gap between adjacent decks within the production area can be achieved in a variety of ways, including through mechanical or electrical control.

Figure 10A:
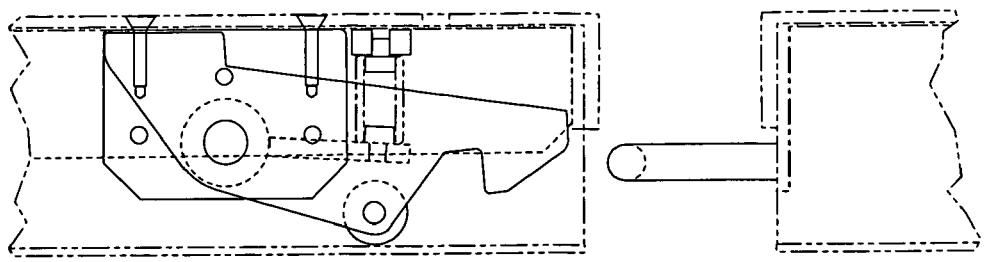
FIGS. 10A–10E illustrate a representative mechanical latch for coupling adjacent platforms within a production area showing exemplary coupling and uncoupling procedures.
Figure 10B:
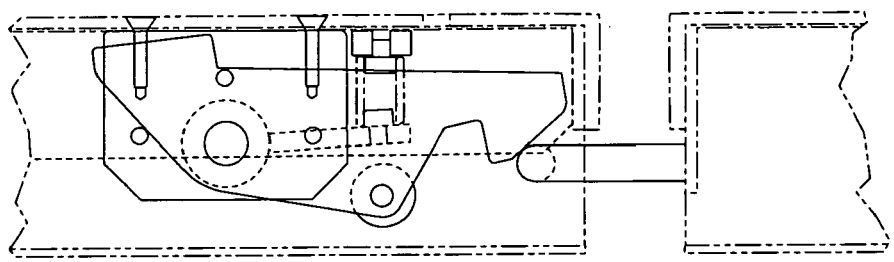
Figure 10C:
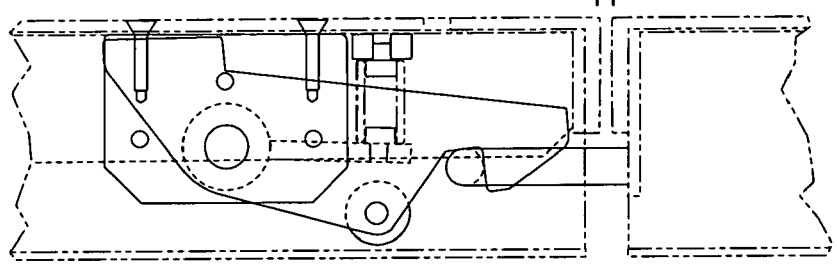
Figure 10D:
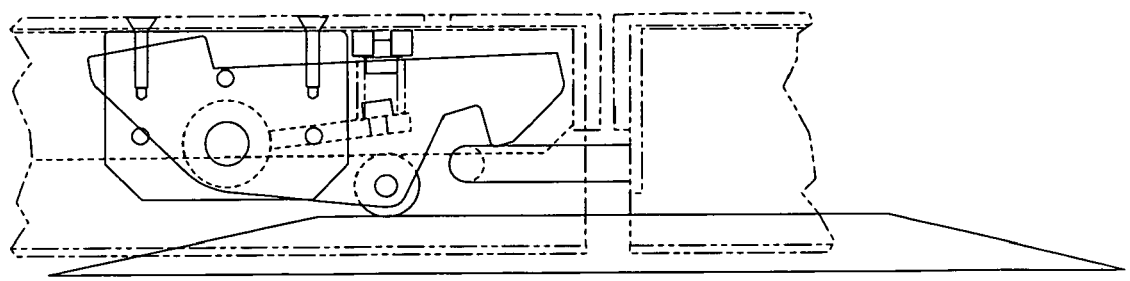
Figure 10E:
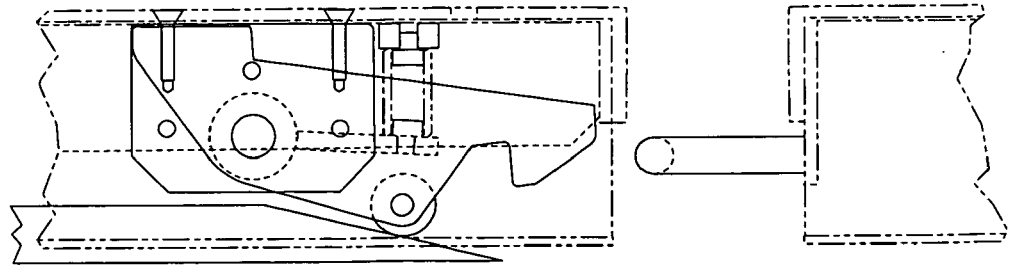

Suitable mechanical couplings may include floor activated cam couplings wherein each platform includes a coupling element at the front or rear end thereof. The structure and operation of a representative mechanical latch is illustrated in FIGS. 10A–10E, wherein FIGS. 10A–10C illustrate the coupling of the mechanical latch without the aid of a cam and FIGS. 10D and 10E illustrate latch uncoupling using an uncoupling cam at the exit end of the production area. If a mechanical coupling is used, the drive wheel 42 of each platform 12 in a production area is preferably provided with a constant current so as to drive the platforms at an approximately equal speed. Any differential longitudinal speed or movement of the platforms creates load sharing between platform drives. It should also be noted that, as is illustrated in FIG. 10D, when the adjacent decks 24a and 24b are mechanically coupled to one another, manufacturing tolerances and other variables inevitably create a small gap 64 between the adjacent decks. This gap, as is described below, may be bridged by a bridging mechanism while permitting differential movement between the adjacent decks without binding.

As noted above, an electrical "coupling" may be used in lieu of or in addition to the mechanical coupling described above in order to maintain "zero" gaps in the production areas. For example, the electrical coupling may be effected by controlling the relative movement of adjacent platforms. In this instance, the CCU 46 or central controller 52 monitors input from sensors, such as optic, sonic, magnetic, electrical, or other sensors, to periodically or continuously determine the gap between adjacent decks. The CCU 46 or controller 52 may then adjust the rotational speed of the drive wheel 42 to maintain a "zero" gap condition. By way of example, the platforms 12 may include a proximity sensor 50 (FIG. 5) positioned on the rear end of each deck. In this embodiment, when the sensor 50 detects the gap and, if the gap exceeds, a predetermined tolerance, the CCU 46 cuts or reduces power to the drive wheel on the platform that is moving too fast. Contact-type electrical connections may also be used on adjacent platforms to communicate synchronization data between the platforms.

In addition to the mechanical and electrical coupling of adjacent platforms within a production area, the maintenance of a "zero" gap may be further provided by progressively slowing the forward velocity of a pallet as it moves through the production area. As a result, the pallets within the production area tend to stack-up. This progressive slow down also facilitates load sharing between the platforms within the production area and may be achieved through conventional control techniques implemented by the CCU 46 or the central controller 52.

Figure 8A:
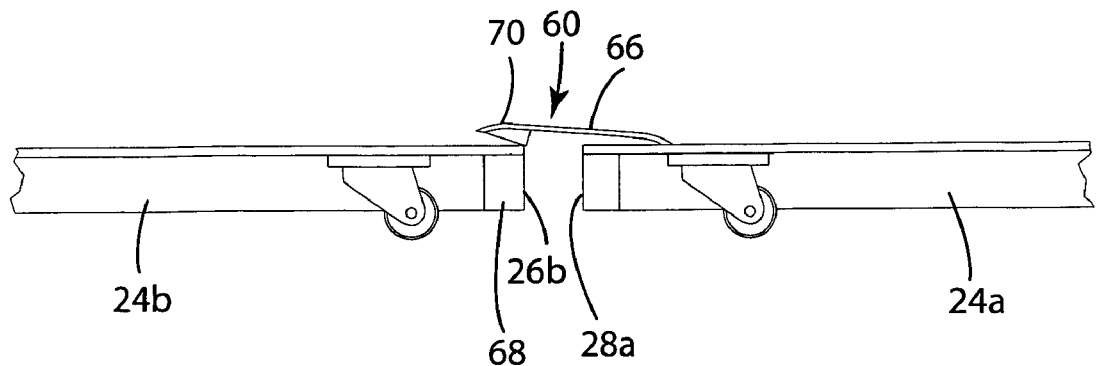
FIG. 8A is a sectional view spanning adjacent platforms within a production area showing a pivoting bridge mechanism for spanning the gap between the adjacent platforms and illustrating the bridge in a pivoted position.
Figure 8B:
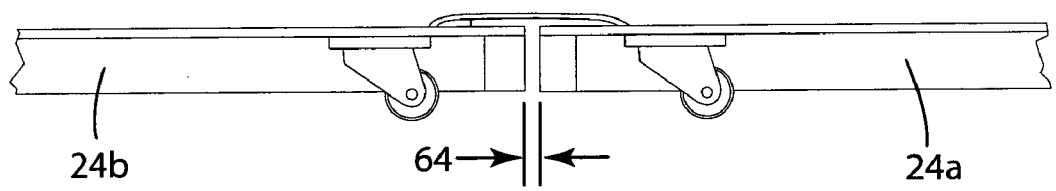
FIG. 8B is a sectional view similar to that shown in FIG. 8A showing the bridge mechanism in its spanning position when the adjacent platforms are in a "zero" gap condition.
Figure 9:
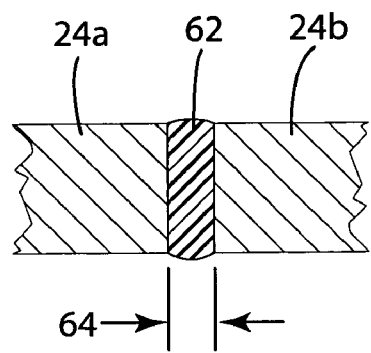
FIG. 9 is a sectional view similar to that shown in FIGS. 8A and 8B and illustrating an alternate bridging mechanism.

Those skilled in the art should appreciate that the above descriptions of mechanical and electrical couplings are representative in nature and that the invention contemplates the use of other coupling mechanisms apparent to those skilled in the art that are capable of maintaining a "zero" gap between adjacent decks in the production areas. Whether a mechanical, electrical, or other coupling is used to achieve the "zero" gap between adjacent decks 24a and 24b (FIGS. 8 and 9) in the production areas, the platforms preferably also include a bridging mechanism to span the "zero" gap 64 thereby creating a continuous assembly platform for the worker. The bridging mechanism may take a variety of embodiments. Two representative embodiments are illustrated in FIGS. 8 and 9 and include a bridge 60 as shown in FIGS. 8A and 8B and collapsible, resilient bumpers 62 as shown in FIG. 9. The illustrated embodiment of the bridge 60 includes a plate 66 pivotally coupled or hinged to one of the platform decks 24a and extending rearward of the rear end 28a thereof. A cam 68 is positioned proximate the front end 26b of the following platform deck 24b. When the decks 24a and 24b approach one another, the plate 66 is pivoted in a clockwise direction by the bridge ramp 70 riding on the cam 68. Once the ramp 70 clears the cam, the bridge pivots counterclockwise and into the operating position as illustrated in FIG. 8B. Those skilled in the art will appreciate that a variety of other such bridging mechanisms may be used with the invention and may be actuated through any number of electrical or mechanical mechanisms, including control by the CCU or mechanical actuation through the use of a floor cam, foot pedal, and the like. Those skilled in the art will also appreciate that a variety of materials may be used for each of these mechanisms. For example, the bumpers 62 may be made of foam, rubber, or other resilient material and may be provided on one or both of the front and rear ends of each platform deck.

Outside of the production areas, such as the buffer zone 14 and delivery area 20, the independent movement of the platforms provide design and operational flexibility not previously achieved in conventional skillet designs. At the ends of the production areas, or at other predetermined areas, each platform can be accelerated to create a gap between adjacent platforms. This gap facilitates movement of the platforms along horizontal turns for end-of-line transfers, forms aisle crossings for traffic control, and otherwise provides system flexibility. For example, separating the platforms outside of the production area facilitates movement of each of the platforms about horizontal turns and through other maneuvers without interference from adjacent platforms.

In the illustrated embodiment, a battery pack 64 is provided on each platform to power the platform components, including the drive assembly 40, CCU 46 and any platform accessories such as the scissor lift. While a variety of batteries may be used, it is contemplated that a set of eight to twelve 12V DC rechargeable batteries may be used. The batteries may be continuously or periodically recharged, such as in return lanes at the assembly line, through inline charging by positioning charging contacts (preferably extending approximately one-half the platform length) to cooperate with charging contacts on the platform, or inductive charging along the assembly line such as through the use of a buried wire. This on-board battery power provides design and operational flexibility when compared to conventional skillets which require the communication of an auxiliary charge to the skillets.

As noted above, the drive mechanism is preferably vertically retractable into a disengaged position. Selectively disengaging the drive mechanism facilitates manual movement of the platforms in the event the drive assembly or guidance system fails thereby permitting the platforms to be removed from the production line or resequencing of the platforms within the production area. It should be appreciated that if such a failure occurs when a platform is in the production area, the other platforms in the production area will share the additional load thereby pushing/pulling the inoperative platform through the production area. In this event, it is desirable to monitor and control motor current to the platform drive wheels via the CCU to avoid damage to the drives. As a result, line speeds may decrease during platform failures to avoid over-taxing the individual platform drives.

A failure detection system is preferably provided to identify platforms in a failed condition so that once the failed platform reaches the end of the line, the failed platform may be manually removed from service. While those skilled in the art will appreciate that a variety of failure detection systems and methods may be used, one exemplary method includes adding a transmitter (such as transmit and receive photocells) on the rear end of each platform and a matching receiver on the front end of the following platform. Audio or visual indicators, such as a horn or fault light could also be provided on each platform. If a platform CCU detects a failure condition, such as by monitoring the platform speed and/or drive current, the CCU would turn on the fault indicator and turn off the tail transmitter on the failed platform. The platform following the failed platform would continuously monitor the input from the front receiver and if not detecting a signal would assume a failed preceding platform and turn on its fault indicator thereby providing an additional visual or audio indication to plant personnel that a platform needs to be removed from operation at the end of the assembly line. The fault condition could also be communicated to a central monitor or control system, such as via a radio link to the central controller 52, for system control or passing the fault indication to the CCU of the failed platform.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A manufacturing operation comprising:
a production area;
a delivery area;
a plurality of platforms each having an independently controllable and steerable drive assembly and a link coupler including a proximity sensor, wherein adjacent platforms are spaced from one another a first distance in said delivery area and a second distance in said production area, said first distance being greater than said second distance and wherein said proximity sensor is mounted to each of the platforms and communicating with a controller, said controller controlling the speed of the platform drive assembly in response to signals from the proximity sensor to maintain zero gaps between adjacent platforms.

2. The manufacturing operation of claim 1 wherein said controller is in communication with the drive assembly to communicate a current command to the drive assembly, thereby controlling the velocity of each platform to maintain said zero gap between adjacent platforms in the production area.

3. The manufacturing operation of claim 2 wherein the plurality of platforms include a first platform and a second platform, said second platform following said first platform in the production area.

4. The manufacturing operation of claim 2 further including a bridge mechanism spanning the zero gap between the first and second platforms in the production area.

5. The manufacturing operation of claim 4 wherein said bridge mechanism includes a bridge plate movably coupled to one of the first and second platforms.

6. The manufacturing operation of claim 5 wherein said bridge plate is pivotably coupled to said one of the first and second platforms and wherein the other of the first and second platforms includes a cam engageable with the pivoting plate.

7. The manufacturing operation of claim 6 wherein said bridge plate is pivotable about an axis substantially perpendicular to a direction of travel of said one of the first and second platforms.

8. The manufacturing operation of claim 4 wherein said bridging mechanism includes a resilient bumper fixed to one of the first and second platforms.

9. The manufacturing operation of claim 1 wherein each of said plurality of platforms further includes a link coupler maintaining a zero gap between adjacent platforms.

10. The manufacturing operation of claim 9 wherein said link coupler includes a latch mechanically coupling adjacent platforms in said production area.

11. The manufacturing operation of claim 1, wherein said controller communicates a current command to the drive assembly to control the velocity of the platform to maintain a zero gap between adjacent platforms in the production area.

12. The manufacturing operation of claim 1 wherein said controller communicates a current command to the drive assembly to control the direction of the platform relative to an adjacent platform.

13. The manufacturing operation of claim 1 further including a central controller in communication with said controller.

14. The manufacturing operation of claim 13 wherein said central controller in communication with said controller controls the velocity of each platform to maintain a zero gap between adjacent platforms in the production area.

15. The manufacturing operation of claim 13 wherein said central controller in communication with said controller controls the direction of said drive assembly.

16. The manufacturing operation of claim 1 wherein said controller is capable of steering said drive assembly.

* * * * *

UNITED STATES PATENT AND TRADEMARK OFFICE
CERTIFICATE OF CORRECTION

| | |
|---|---|
| PATENT NO. | : 7,178,660 B2 |
| APPLICATION NO. | : 10/611611 |
| DATED | : February 20, 2007 |
| INVENTOR(S) | : Dehne et al. |

It is certified that error appears in the above-identified patent and that said Letters Patent is hereby corrected as shown below:

ON THE TITLE PAGE ITEM (75) DELETE INVENTORS "EARL A. RAYNAL, JR., PETOSKEY, MI (US) AND TIMOTHY R. CRUMBAUGH, BOYNE CITY, MI (US)"
ITEM (75) SHOULD READ INVENTORS --NOEL F. DEHNE, GERALD E. CHILSON, JAMES J. BEDELLS AND LEWIS R. POLE--

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,178,660 B2 | Page 1 of 1 |
| APPLICATION NO. | : 10/611611 | |
| DATED | : February 20, 2007 | |
| INVENTOR(S) | : Dehne et al. | |

It is certified that error appears in the above-identified patent and that said Letters Patent is hereby corrected as shown below:

ON THE TITLE PAGE ITEM (75) DELETE INVENTORS "EARL A. RAYNAL, JR., PETOSKEY, MI (US) AND TIMOTHY R. CRUMBAUGH, BOYNE CITY, MI (US)"
ITEM (75) SHOULD READ INVENTORS --NOEL F. DEHNE, GERALD E. CHILSON, JAMES J. BEDELLS AND LEWIS R. POOLE--

This certificate supersedes the Certificate of Correction issued May 1, 2007.

Signed and Sealed this

Twenty-fourth Day of June, 2008

JON W. DUDAS
*Director of the United States Patent and Trademark Office*